United States Patent
Zohar et al.

(10) Patent No.: US 7,549,029 B2
(45) Date of Patent: *Jun. 16, 2009

(54) METHODS FOR CREATING HIERARCHICAL COPIES

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL); Efri Zeidner, Kiryat Mozkin (IL)

(73) Assignee: International Business Machines Corporation, Armonk, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 11/265,396

(22) Filed: Nov. 2, 2005

(65) Prior Publication Data

US 2006/0253670 A1 Nov. 9, 2006

Related U.S. Application Data

(63) Continuation-in-part of application No. 11/123,993, filed on May 6, 2005.

(51) Int. Cl.
*G06F 13/00* (2006.01)
(52) U.S. Cl. ..................................................... 711/162
(58) Field of Classification Search ................... 711/162
See application file for complete search history.

(56) References Cited

U.S. PATENT DOCUMENTS

| | | | |
|---|---|---|---|
| 5,897,661 A | 4/1999 | Baranovsky et al. | |
| 6,088,764 A | 7/2000 | Shyam et al. | |
| 6,108,749 A * | 8/2000 | White et al. | 711/112 |
| 6,182,198 B1 * | 1/2001 | Hubis et al. | 711/162 |
| 6,513,102 B2 | 1/2003 | Garrett et al. | |
| 6,574,703 B1 | 6/2003 | Don et al. | |
| 6,687,718 B2 | 2/2004 | Gagne et al. | |
| 6,742,138 B1 | 5/2004 | Gagne et al. | |
| 6,779,094 B2 | 8/2004 | Selkirk et al. | |
| 6,779,095 B2 * | 8/2004 | Selkirk et al. | 711/165 |
| 6,820,099 B1 | 11/2004 | Huber et al. | |
| 6,839,827 B1 | 1/2005 | Beardsley et al. | |
| 6,898,681 B2 * | 5/2005 | Young | 711/162 |
| 6,934,822 B2 * | 8/2005 | Armangau et al. | 711/162 |
| 7,266,654 B2 * | 9/2007 | Nakano et al. | 711/162 |

(Continued)

OTHER PUBLICATIONS

Sukwoo Kang et al. "Virtual Allocation: A Scheme for Flexible Storage Allocation." Department of Electrical Engineering, Texas A&M University.

(Continued)

*Primary Examiner*—Shane M Thomas
*Assistant Examiner*—John P Fishburn
(74) *Attorney, Agent, or Firm*—Griffiths & Seaton PLLC

(57) ABSTRACT

A method for copying a logical volume in a data storage system includes forming a first logical volume, storing in physical storage of the data storage system a quantity of data of the first logical volume, and receiving a first command to copy the first logical volume to a second logical volume. In response to the first command, meta-data is formed having a size that is independent of the quantity of the data. In response to a second command to access the data, the meta-data is used to access the data.

6 Claims, 4 Drawing Sheets

U.S. PATENT DOCUMENTS

2003/0005248 A1* 1/2003 Selkirk et al. ............... 711/165
2003/0195864 A1 10/2003 Vishlitzky et al.
2003/0195887 A1 10/2003 Vishlitzky et al.
2003/0208463 A1 11/2003 Vishlitzky et al.
2004/0128443 A1* 7/2004 Kaneda et al. ............... 711/114
2005/0114617 A1* 5/2005 Kopylovitz ................. 711/165

OTHER PUBLICATIONS

Paul R. Wilson et al. "Dynamic Storage Allocation: A Survey and Critical Review" Department of Computer Sciences, University of Texas at Austin.

* cited by examiner

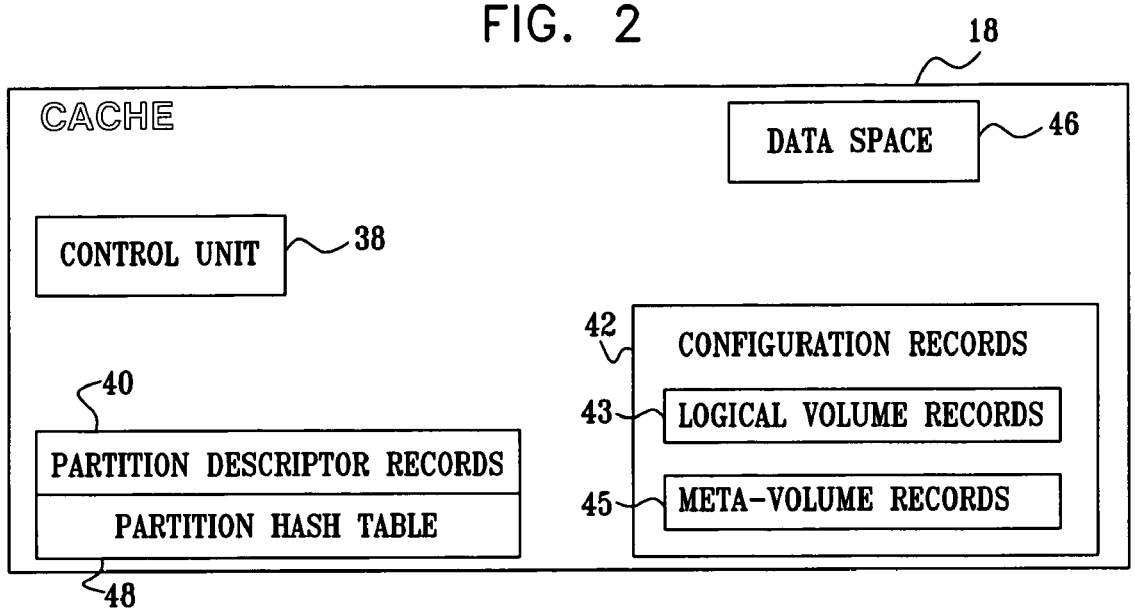
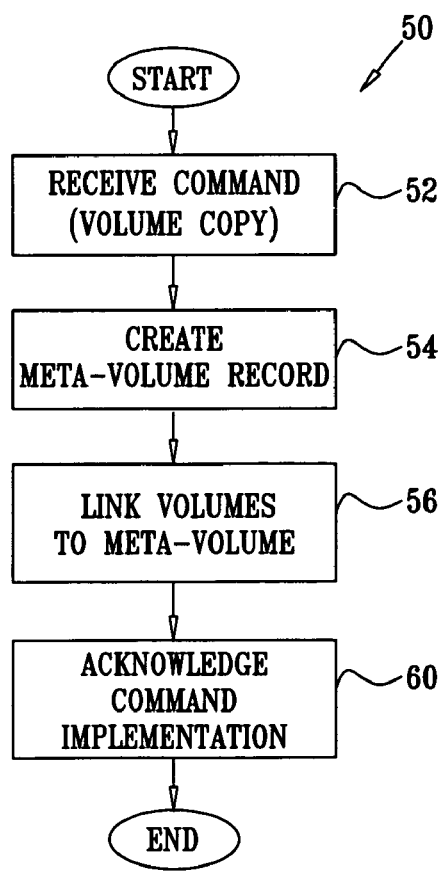

METHODS FOR CREATING HIERARCHICAL COPIES

RELATED APPLICATIONS

This application is a continuation-in-part of U.S. patent application Ser. No. 11/123,993 titled "Data Storage Methods for Hierarchical Copies," filed May 6, 2005, which is incorporated herein by reference.

FIELD OF THE INVENTION

The present invention relates generally to methods and apparatus for data storage. More particularly, the present invention relates to methods and apparatus for managing copies of logical volumes in data storage systems.

BACKGROUND OF THE INVENTION

Data storage systems generally store data on physical media in a manner that is transparent to host computers. From the perspective of a host computer, data is stored at logical addresses located on file systems, or logical volumes. Logical volumes are typically configured to store the data required for a specific data processing application. Data storage systems map such logical addresses to addressable physical locations on storage media, such as direct access hard disks. In a typical configuration, physical locations comprise tracks on a hard disk. A track can typically store many blocks of data.

System administrators frequently need to make copies of logical volumes in order to perform backups or to test and validate new applications. Data storage systems may implement copying tasks without physically copying the data, using techniques termed "instant copying." When an instant copy is made, data is written to a new physical location only when a portion of the data is subsequently modified.

U.S. Pat. No. 6,779,094 to Selkirk, et al., whose disclosure is incorporated herein by reference, describes various instant copy mechanisms for copying data upon receiving a write operation to either original or copy data. Upon receiving a write operation for writing new data to a first data location, new data is written to a second data location. Multiple layers of mapping tables provide unique identification of the storage location of the data such that individual entries in the mapping tables are variable and may be self-defining.

U.S. Pat. No. 6,779,095 to Selkirk, et al., whose disclosure is incorporated herein by reference, describes the use of a plurality of layers of mapping tables for storing data. The mapping tables provide unique identification of location of the data. When the data is copied, the physical placement of the original data is described by a mapping mechanism known as the original data map. This identifies the physical storage location used to store the original data. The physical placement of the copy data is described by a mapping mechanism known as the copy data map. This identifies the physical storage location used to store the copy data.

U.S. Patent Publications 2003/0195887 and 2003/0208463 to Vishlitzky, et al., whose disclosures are incorporated herein by reference, describe a storage device containing a first storage area of a first type containing data and a second storage area of a second type containing a table of pointers to data provided in the storage area of the first type. The second storage area is a virtual storage area containing no sections of data and represents a copy of data of the first storage area at a point in time.

U.S. Pat. No. 6,820,099 to Huber, et al., whose disclosure is incorporated herein by reference, describes the use of a snapshot volume to update a primary, or "base," logical volume. Updates are made to the snapshot volume while the base volume is still used to satisfy normal data access requests. After the updating of the snapshot is complete, the snapshot is rolled back to the base volume. During rollback, updated data are available from either the snapshot or from the base volume, and thus the updating appears to be instantaneous.

U.S. Pat. No. 6,687,718 to Gagne, et al., whose disclosure is incorporated herein by reference, describes transferring data from a data altering apparatus, such as a production data processing site, to a remote data receiving site. A data storage facility includes a first data store for recording each change in the data generated by the data altering apparatus. A register set records each change on a track-by-track basis. A second data store has first and second operating modes. During a first operating mode the second data store becomes a mirror of the first data store. During a second operating mode the second data store ceases to act as a mirror and becomes a source for a transfer of data to the data receiving site. Only information that has been altered, i.e., specific tracks that have been altered, are transferred during successive operations in the second operating mode.

U.S. Pat. No. 6,513,102 to Garrett, et al., whose disclosure is incorporated herein by reference, describes a system for transferring data from a first storage device, accessible to a first command processor, to a second storage device accessible to a second command processor but not necessarily to the first processor. In this aspect of the invention, the transfer is made internally of the storage controller rather than requiring the command processors to communicate directly with each other.

U.S. Pat. No. 6,742,138 to Gagne, et al., whose disclosure is incorporated herein by reference, describes a data recovery program that restores data in a first storage device using data from a second storage device. The program also updates the first storage device with data supplied from a host.

U.S. Pat. No. 6,574,703 to Don, et al., whose disclosure is incorporated herein by reference, describes a method for initializing an extent on a mass storage device having at least one track. The method preserves data in a track from being overwritten, and indicates that the data of the track is to be replaced. The method also associates an initialization code with the track indicating that the track is to be initialized.

U.S. Patent Publication 2003/0195864 to Vishlitzky, et al., whose disclosure is incorporated herein by reference, describes providing storage areas of a multiplicity of types that contain sections of data. Pointers are provided that are claimed to allow access or not to allow access to the data.

U.S. Pat. No. 6,839,827 to Beardsley, et al., whose disclosure is incorporated herein by reference, describes a method for mapping logical blocks to physical storage blocks. A storage controller defines the logical storage space as a sequence of logical chunks, wherein each logical chunk comprises a plurality of logical blocks in the logical storage space. The storage controller further defines a physical storage space as a sequence of physical chunks, wherein each physical chunk comprises a plurality of physical blocks in the physical storage system. The storage controller associates each logical chunk in the sequence of logical chunks defining the logical storage space with one physical chunk in the physical storage system. Further, the contiguous logical chunks are capable of being associated with non-contiguous physical chunks.

U.S. Pat. No. 6,088,764 to Shyam, et al., whose disclosure is incorporated herein by reference, describes a method for reducing space allocation failures in a computer system that utilizes direct access storage devices to store data. The method comprises the steps of determining if authorization has been given to attempt to allocate an initial space request over more than one volume, and, if so, attempting to allocate space on a plurality of volumes. If the initial space request cannot be allocated on a plurality of volumes, the initial space request is reduced by a preset percentage, an extent limit is removed and an attempt is made to allocate the reduced space request on the plurality of volumes.

U.S. Pat. No. 5,897,661 to Baranovsky, et al., whose disclosure is incorporated herein by reference, describes an apparatus providing a logical unit of undivided data storage that spans physical storage device boundaries. The apparatus manages the logical unit of undivided storage using metadata information stored on the physical storage devices. Advantageously, the apparatus replicates a minimum portion of the metadata information across all of the data storage devices and favors writing metadata only in the devices where the information is required to operate. In a preferred embodiment, a logical unit of undivided storage is created by defining a logical volume and allocating portions of available physical data storage devices thereto in order to provide a minimum logical volume size. Metadata is generated and stored on the data storage devices to provide detailed information about the portions of each data storage device that have been allocated to the logical volume.

A paper by Kang, et al., "Virtual Allocation: A Scheme for Flexible Storage Allocation," published at the OASIS Workshop, Boston, Mass., Oct. 9-13, 2004, and available at http://ee.tamu.edu/~swkang/doc/va.pdf, is incorporated herein by reference. The paper describes physical storage allocation strategies that provide large shared areas with virtual storage for multiple file systems.

A paper by Wilson, et al., "Dynamic Storage Allocation: A survey and critical review," published in Proceedings of the 1995 International Workshop on Memory Management, Kinrose, Scotland, UK, Sep. 27-29, 1995, Springer Verlag LNCS, and available at the website www.cs.northwestern.edu/-pdinda/ics-f02/doc/dsa.pdf, is incorporated herein by reference. The paper covers techniques for dynamic allocation of physical storage, or heap storage.

SUMMARY OF THE INVENTION

Embodiments of the present invention provide efficient methods and apparatus for creating logical data copies in a data storage system.

In embodiments of the present invention, a data storage system receives, typically from a host computer, a first write command to store data of a first logical volume. The storage system stores the data at one or more addressable physical locations, hereinafter referred to as physical addresses. The storage system associates said physical addresses with one or more respective logical partitions of the first logical volume. Partition descriptor records (PDRs) of the storage system comprise fields that provide the association between physical addresses to logical partitions.

To generate a logical volume copy, the storage system receives a management copy command to copy the first logical volume, referred to herein as a source volume, to a second logical volume, referred to herein as a copied volume. In response to the command, the storage system links the source volume to a meta-volume and links the meta-volume to the copied volume, thereby forming a hierarchy of volumes in which the source volume is superior to the meta-volume, which is, in turn, superior to the copied volume. The hierarchy determines the order in which volumes are searched when a subsequent data access command is received.

Upon receiving a command (e.g., a read command) to access data in the copied volume, the system will first check whether a partition descriptor record (PDR) exists associating the desired data with the copied volume. If not, the system will check whether the PDR for the desired data is associated with a superior volume in the hierarchy. Successive superior volumes are checked in an iterative process until the PDR is found.

When the data storage system receives a write command to write data at a logical partition in the source logical volume, the data is written to a new physical address and a new PDR is created, linked to the source logical volume. Old data of the logical partition, stored at an old physical address, is linked by a PDR to the meta-volume, which is superior to the copied volume in the hierarchy of volumes. The data thereby remains available to subsequent commands to access data of the copied volume. Furthermore, there is virtually no limit to the number of copies that may be made of the source volume or of any copied volume in the system, and full read/write access is provided for all volumes.

There is therefore provided, in accordance with an embodiment of the present invention, a method for copying a logical volume in a data storage system, including:

forming a first logical volume;

storing in physical storage of the data storage system a quantity of data of the first logical volume;

receiving a first command to copy the first logical volume to a second logical volume;

responsively to the first command, forming meta-data having a size that is independent of the quantity of the data;

receiving a second command to access the data; and responsively to the second command, using the meta-data to access the data.

Typically, forming the meta-data includes creating no partition descriptor records.

Typically, the meta-data includes a meta-volume. Using the meta-data typically includes seeking a partition descriptor record associated with the meta-volume. Forming the meta-data typically includes associating the first and second logical volumes and the meta-volume. Creating this association typically includes establishing a search order among the first and second logical volumes and the meta-volume, and accessing the data typically includes following the search order to seek a partition descriptor record.

In some embodiments, receiving the second command includes receiving a write command and accessing the data includes modifying the data. Typically, the data includes original data, storing the original data includes writing the original data to a first physical location in the physical storage, and modifying the original data includes writing modified data to a second physical location in the physical storage. Modifying the original data typically includes creating a partition descriptor record that associates a meta-volume with the first physical location.

In some embodiments, modifying the original data includes testing a change flag that indicates whether access to the original data is to be preserved.

There is further provided apparatus for copying a logical volume in a data storage system, including:

physical storage; and a control unit, which is adapted to:

form a first logical volume;

store in the physical storage a quantity of data of the first logical volume;

receive a first command to copy the first logical volume to a second logical volume;

responsively to the first command, form meta-data having a size that is independent of the quantity of the data;
receive a second command to access the data; and
responsively to the second command, use the meta-data to access the data.

Typically, the control unit is adapted to form the meta-data by creating no partition descriptor records.

Typically, the meta-data includes a meta-volume and the control unit is adapted to use the meta-data to seek a partition descriptor record associated with the meta-volume. The control unit is also adapted to form the meta-data by associating the first and second logical volumes and the meta-volume. In some embodiments, the control unit is adapted to establish a search order among the first and second logical volumes and the meta-volume and to follow the search order during a search for a partition descriptor record.

In typical embodiments, the second command includes receiving a write command and the control unit is adapted responsively to the write command to modify the data. Typically, the data includes original data, and the control unit is adapted:

to store the original data by writing the original data to a first physical location in the physical storage; and to modify the original data by writing modified data to a second physical location in the physical storage.

Typically, the control unit is adapted responsively to receiving the write command to create a partition descriptor record associating a meta-volume with the first physical location. In some embodiments, the control unit is adapted responsively to receiving the write command to test a change flag indicating whether the original data is to be preserved.

The present invention will be more fully understood from the following detailed description of the embodiments thereof, taken together with the drawings in which:

BRIEF DESCRIPTION OF THE DRAWINGS

FIG. 2 is a schematic diagram of a cache in the data storage system of FIG. 1, in accordance with an embodiment of the present invention;

FIG. 3 is a flowchart of a process implemented when a copy volume command is received by the data storage system of FIG. 1, in accordance with an embodiment of the present invention;

DETAILED DESCRIPTION OF EMBODIMENTS

Figure 1:
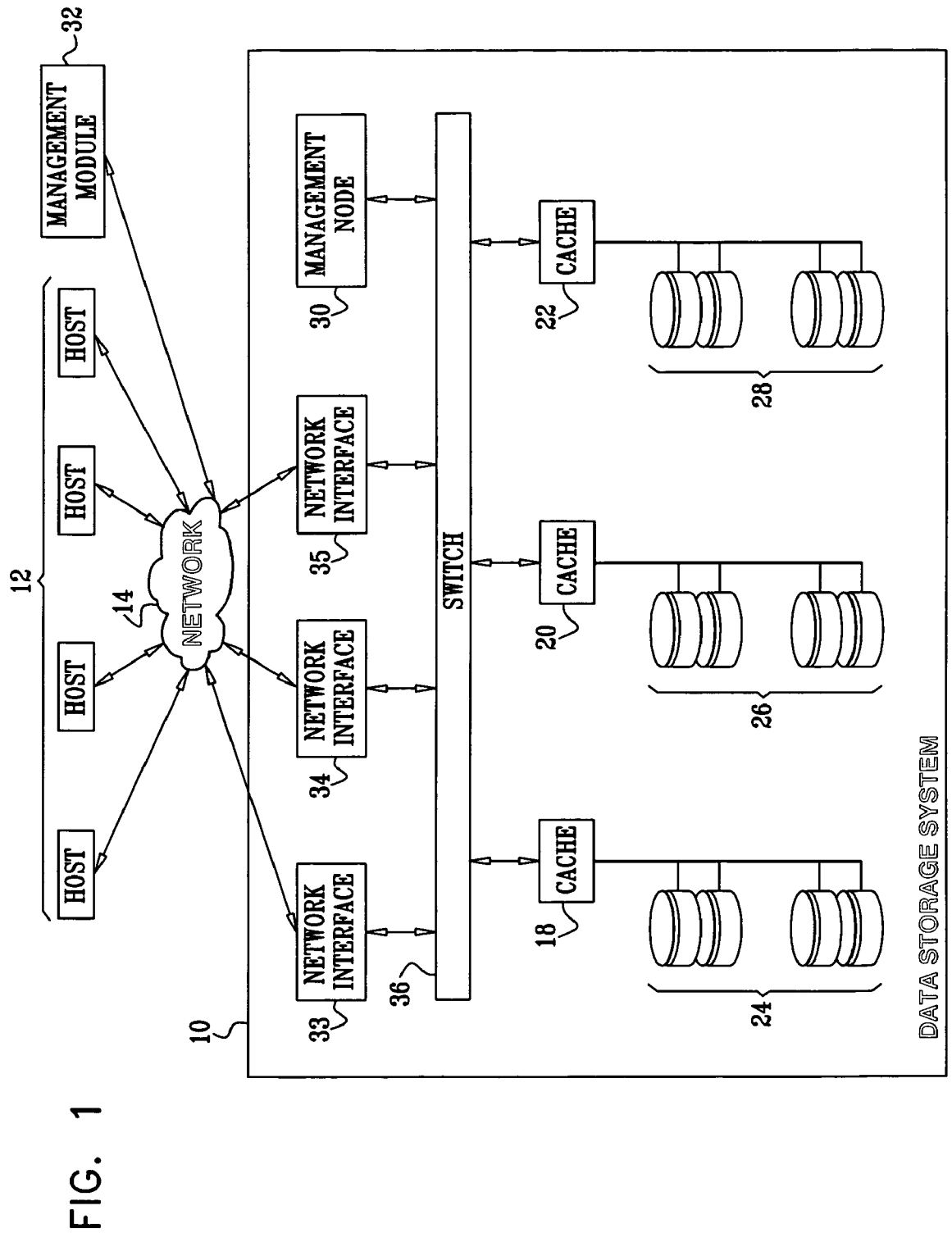
FIG. 1 is a schematic diagram of a data storage system, in accordance with an embodiment of the present invention.

Reference is now made to FIG. 1, which schematically illustrates a storage system 10, in accordance with an embodiment of the present invention. Storage system 10 receives input/output (I/O) commands from one or more host computers 12. Host computers 12 are coupled to storage system 10 by any means known in the art, for example, via a network 14.

I/O commands comprise commands to read or write data at logical addresses on logical volumes. The logical addresses specify a range of data blocks within a logical volume, each block herein being assumed by way of example to contain 512 bytes.

Storage system 10 typically operates in, or as, a network attached storage (NAS) or a storage area network (SAN) system.

Storage system 10 comprises one or more caches, indicated in FIG. 1 as caches 18, 20, and 22. Elements in the caches of the system, and operations of the caches, are described in more detail below with respect to FIG. 2. The one or more caches may be implemented to act as a central cache for system 10.

Each of the caches is assumed to be approximately equal in size and is also assumed to be coupled, by way of example, in a one-to-one correspondence with a set of physical storage. FIG. 1 shows caches 18, 20, and 22 coupled to respective sets of physical storage 24, 26, and 28. In response to an I/O command, cache 18, by way of example, may read or write data at addressable physical locations of physical storage 24. A single addressable physical location, also referred to herein as a track, typically contains 128 data blocks.

In some embodiments of the present invention, a management node 30 of storage system 10 receives from a management module 32 a formation command to form a logical volume V1. The management module may be run from a dedicated external computing system or from one or more of the host computers. The purpose of the formation command is to permit host computers 12 to specify logical addresses of V1 in subsequent I/O commands.

In response to the formation command, management node 30 creates routing records indicating how the logical addresses of V1 are to be distributed across caches 18, 20, and 22. The routing of logical addresses is typically implemented according to methods described in US Patent Publication 2005/0015566, titled "Data Allocation in a Distributed Storage System," which is incorporated herein by reference. According to the aforementioned methods, management node 30 assigns logical addresses to partitions, each partition being equal in size to a track. However, the scope of the present invention is not limited to a specific method for routing and assigning logical addresses, so that it will be understood that the scope of the present invention includes any other method for performing such address routing and/or assignment known in the art. The routing records, indicating the association of logical addresses of logical volumes with partitions and the association of the partitions with caches, are distributed by the management node to one or more generally similar network interfaces indicated in FIG. 1 as three network interfaces 33, 34, and 35.

Referring back to the formation command to form volume V1, in addition to assigning logical addresses, management node 30 also distributes messages to caches 18, 20, and 22 instructing the caches to form V1. Implementation of the formation command by the caches is described further hereinbelow (FIG. 2).

Subsequent to the formation of V1, network interfaces 33, 34, and 35 receive I/O commands from host computers 12, which are then distributed among caches 18, 20, and 22. Each cache, upon receiving such a command, then determines a physical location, i.e., a track, associated with a specified partition.

Routing of commands from network interfaces 33, 34, and 35 to each cache is typically performed over a network and/or a switch, such as a switch 36.

Figure 4:
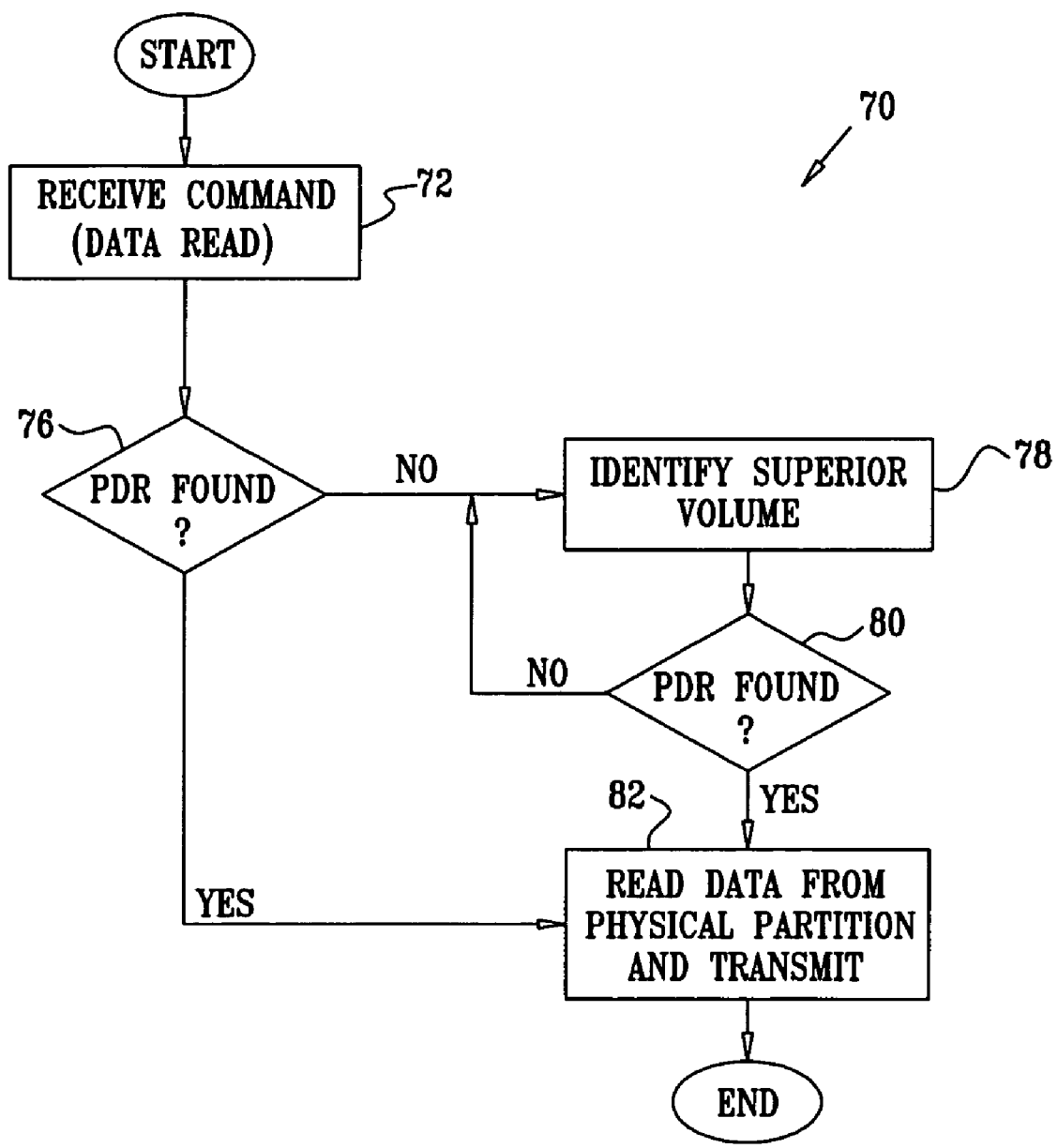
FIG. 4 is a flowchart of a process implemented when a data read command is received by the data storage system of FIG. 1, in accordance with an embodiment of the present invention.
Figure 5:
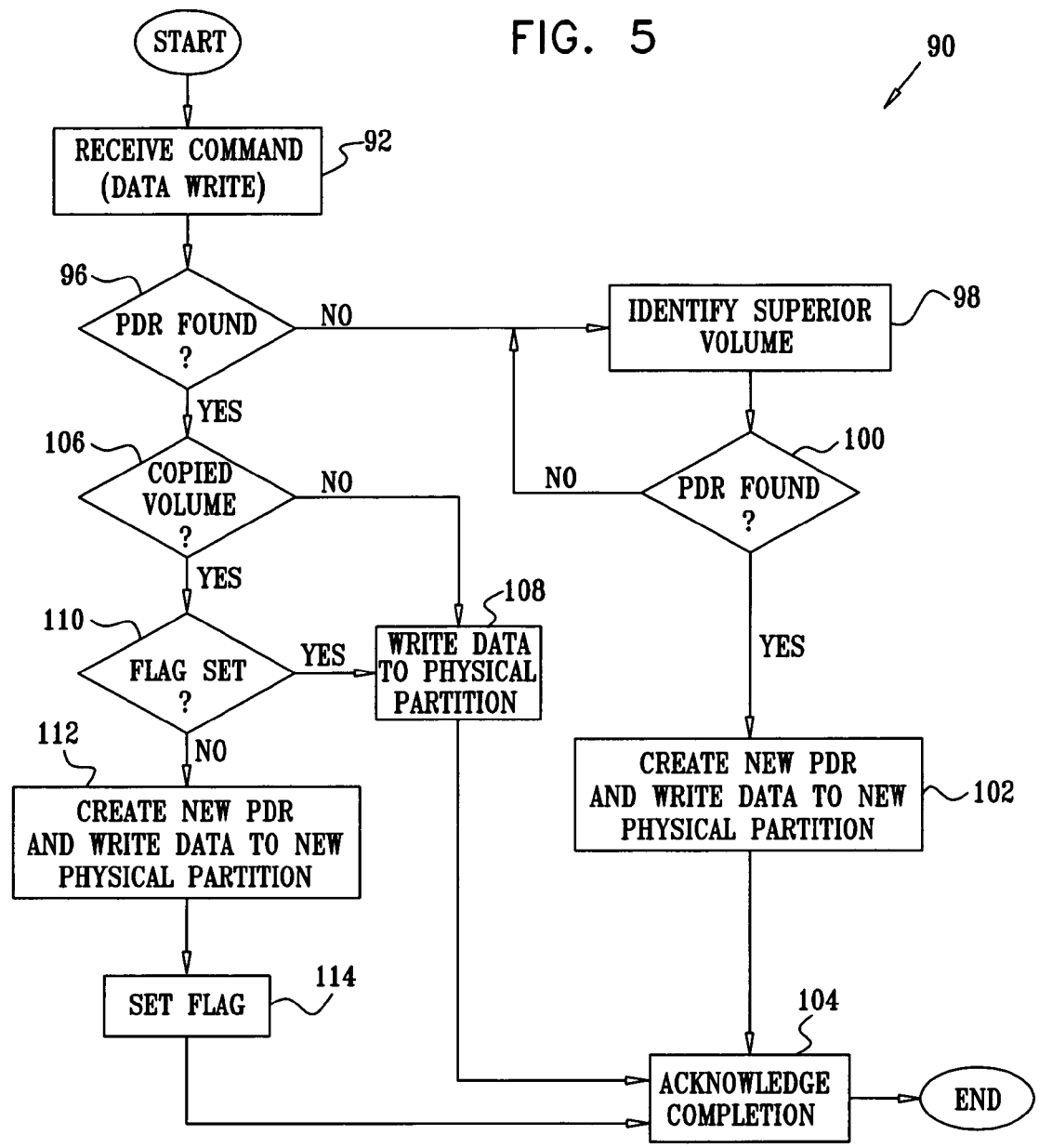
FIG. 5 is a flowchart of a process implemented when a data write command is received by the data storage system of FIG. 1, in accordance with an embodiment of the present invention.

FIG. 2 is a schematic diagram of elements of cache 18 of FIG. 1, in accordance with an embodiment of the present invention. A control unit 38 performs the processing and communications functions of the cache. The control unit manages communications with the network interfaces over switch 36. Alternatively, in configurations of the present invention in which storage system 10 comprises only a single cache 18, control unit 38 communicates directly with host computers 12 over network 14. Control unit 38 also performs the tasks of reading and writing data to physical storage 24. The control unit determines tracks of the physical storage at which to read and write data, performing this determination by using partition descriptor records 40, herein referred to as PDRs, and by using configuration records 42, according to processes described hereinbelow (FIGS. 4 and 5). The PDRs of cache 18 associate the partitions allocated to cache 18 with tracks of physical storage 24.

Control unit 38 also communicates with management node 30. In response to management commands to form or to copy logical volumes, the control unit creates configuration records 42. Configuration records comprise logical volume records 43 and meta-volume records 45. Configuration records and PDRs are collectively referred to as meta-data.

Cache 18 also comprises a data space 46, wherein data may be manipulated or temporarily stored during an I/O process. Cache 18 further comprises a partition hash table 48 used by control unit 38 to access PDRs.

An Appendix to the present disclosure, hereinbelow, details five sets of configuration records and PDRs of cache 18. In the Appendix, each record has a space for an explanatory comment, which is provided as needed. Set 1 provides examples of configuration records and PDRs that may be defined in cache 18 when the data storage system stores three logical volumes, named respectively V1, V2, and V3. Sets 2 through 4 show how the configuration records and PDRs change during the implementation of I/O and management commands.

As described above, the configuration records (i.e., logical volume records and meta-volume records) are generated in response to commands from management node 30. PDRs are created only in response to write commands from the network interfaces.

As shown in Set 1, the first type of configuration records, the logical volume records, comprise three fields, these being a logical volume name field, a size field, assumed herein by way of example to be measured in thousands of partitions, and a superior volume field. It will be appreciated that the logical volume names used herein are for purposes of illustration only, as numeric values are typically used in computer communications. For clarity, additional fields comprised in a logical volume record, and which may be used for functions of the cache unrelated to the present invention, such as date and security key fields, are not shown.

Lines 1, 2, and 3 of Set 1 show the logical volume records for V1, V2, and V3. The logical volume records are created in response to volume formation commands from the management node.

As indicated by the size fields of their records, V1 and V3 have equivalent allocations of 100K partitions, which is approximately 6 gigabytes (GB). V2 is allocated 200K partitions. It should be noted that storage system 10 may be configured to operate in either a fixed allocation mode or a dynamic allocation mode. Methods for performing such allocations are described in the abovementioned U.S. patent application Ser. No. 11/123,993.

The meta-volume fields of the three logical volume records (lines 1, 2, and 3) are either zero or null to indicate that in the state shown by Set 1, the logical volumes are not associated with meta-volumes. Meta-volumes only exist after the data storage system has implemented a copy command, as described hereinbelow.

Set 1 shows several PDRs (lines 7 through 13) maintained by cache 18. During typical operation, the caches may maintain several hundred thousand PDRs or more. PDRs comprise four fields: a volume name field, a partition name or identification (ID) field, a change flag, and a physical address field. The change flag indicates whether the data addressed by the PDR has been changed since the last copy volume command was performed on the volume associated with the PDR.

By way of example, in the PDR of line 7, the volume is V1, the partition ID is P1, the change flag is 0, and the physical address is PYYY01. The PDR thus provides a link between the logical address, comprising the volume and partition ID, and the physical address at which the data is stored. The change flag is described further hereinbelow in relation to process 90 (FIG. 5).

In embodiments of the present invention the partition descriptor records are created only when data is actually written to physical storage. Thus the resources required by cache 18 for meta-data are proportional to the amount of data actually stored, not to the amount of data allocated for logical volumes.

FIG. 3 is a flowchart of a process 50 implemented when cache 18 receives a command to copy a source logical volume to a copied logical volume, in accordance with an embodiment of the present invention.

At a step 52, cache 18 receives a copy command from management node 30 specifying that V3 is assigned as a copy of V1. Set 2 of the Appendix provides examples of the configuration records created by control unit 38 of cache 18 when the copy command is implemented. At a step 54, a meta-volume is created by defining a meta-volume record (line 14 of Set 2). The meta-volume record comprises three fields, a meta-volume field, which names the meta-volume, a size field, and a superior volume field.

In the example indicated in Set 2, the meta-volume is created with the name MV1. The size field is set equal to the size of the source volume V1, namely 100. The superior volume field is also set to be the source volume, i.e., V1. (As described in further examples provided hereinbelow, a superior volume may be a logical volume or a meta-volume.)

At a step 56, the meta-volume field of the logical volume record for V3 is linked to MV1 (line 17 of Set 2).

As is demonstrated by comparing Set 2 and Set 1, cache 18 creates no new PDRs in response to the copy command. Consequently, the size of the meta-data created is limited to the size of a single meta-volume record, MV1. It will be understood that the size of the meta-data created is therefore independent of the size of the source logical volume. Moreover, the size of the meta-data created is independent of the quantity of data that has been written to the source logical volume. It will therefore be understood that the size of the meta-data created is not proportional to the quantity of data that has been written to the source logical volume or to the number of partition descriptor records that have been defined for the source logical volume.

Because of this size independence, the duration of process 50 is also independent of the quantity of data that has been written to the source logical volume. Furthermore, the duration of the process is substantially instantaneous, being limited to the time required to create the single meta-volume record and to modify a single logical volume record. In the event that steps 52 through 56 have completed successfully, cache 18 provides management node 30 with an acknowledgement of success at a step 60, after which process 50 is complete.

It will be understood that implementation of the copy command may be configured within storage system 10 to be an atomic process. Furthermore, the property of atomicity, as well as the properties of size independence and instantaneity described above, applies no matter how many copies of a volume are made.

FIG. 4 is a flowchart of a process 70 implemented by cache 18 upon receiving a command to read data, subsequent to implementing process 50, in accordance with an embodiment of the present invention. At an initial step 72, control unit 38 of cache 18 receives a data read command from one of network interfaces 33, 34, and 35. By way of example, the command is assumed to be received from network interface 33. The command is a request to read data at a logical address, such as blocks 125 through 128 of partition P1 of V3.

At a decision step 76, the control unit determines whether there exists a PDR associated with P1 of V3. Partition hash table 48 (FIG. 2) is used to facilitate the search through the PDR records, since, as stated above, there are typically many records.

Assuming the meta-data state indicated by Set 2, no PDR exists for P1 of V3. The "no" branch of step 76 is therefore followed, and processing continues at a step 78. At this step, control unit 38 checks the superior volume link for V3, (line 17 of Set 2). The superior volume field shows that V3 is linked to MV1.

Processing continues at decision step 80, at which the control unit seeks a PDR for P1 associated with MV1. As in step 76, partition hash table 48 is used to facilitate the search through the PDR records. Again, no PDR exists, that is, there is no PDR for P1 associated with MV1, and processing continues at step 78, at which the superior volume of meta-volume MV1 is identified as V1 (line 14). At decision step 80, a PDR is located for P1 of V1 (line 22 of Set 2). Because V3 was created in an "instantaneous" manner to be a copy of V1, according to process 50 described above, the data of P1 of V3 is still stored at a physical address linked to P1 of V1. At a step 82, the control unit reads the data into data space 46 from the track PYYY01 indicated by the PDR identified at step 80. The control unit then outputs blocks 125 through 128 of the track to network interface 33, thereby satisfying the request of the read command and completing process 70.

It will be understood that a command requesting data from partition P1 of V1, rather than V3, is implemented without the multiple PDR search iterations, as V1 has no superior volumes and the relevant data would be found at the initial decision step 76. The present invention thus provides an efficient method of handling instantaneous copying when significantly more I/O activity is directed towards source volumes rather than towards volumes which have been formed as copied volumes.

FIG. 5 is a flowchart of a process 90 implemented by cache 18 upon receiving a command to write data, subsequent to implementing process 50, in accordance with an embodiment of the present invention. Prior to implementation of process 90, Set 2 is assumed to reflect the state of meta-data of cache 18.

At an initial step 92, control unit 38 of cache 18 receives a data write command specifying new data that is to be written to a logical address. By way of a first example of process 90, the command is assumed to address blocks 125 through 128 of partition P1 of V1.

At a decision step 96, control unit 38 determines whether there exists a PDR associated with P1 of V1. Partition hash table 48 (FIG. 2) is used to facilitate the search through the PDR records. A PDR exists for P1 of V1 (line 22 of Set 2), and processing therefore follows the "yes" branch from step 96 to a further decision step 106. At step 106, a check is made to determine whether a copy has been created of V1, by checking the meta-volume records. As the answer is affirmative, given that V1 is listed as the superior volume of MV1 (line 14), processing continues at a further decision step 110.

At step 110, the change flag of the PDR identified at step 96 is tested to determine whether the data at P1 has been modified since the last copy command was performed on V1. Because the change flag is still 0 (line 22 of Set 2), the current write command is the first write command implemented on P1 since the last copy of V1 was created. As the copy command (process 50 of FIG. 3) does not copy physical data and, furthermore, does not copy PDRs of the source volume to the copied volume, the PDR P1 of V1 is currently the only PDR available to cache 18 for accessing the data of P1 of V3. Consequently, before the current write command can be performed to modify the data of P1 of V1, access to the data associated with V3 must be preserved. At a step 112, access is preserved by creating a new PDR. The new PDR points to the physical address that was previously associated with P1 of V1. After this PDR is created, the new data of P1 of V1 is written to a new physical address, and the P1 PDR of V1 is modified to reflect the new physical address. Subsequently, at a step 114, the change flag of the P1 PDR of V1 is set, to indicate that the data relevant to the last copy command is no longer accessible by way of the PDR.

The PDR changes implemented at steps 112 and 114 are shown in Set 3, wherein line 37 indicates the modified P1 PDR of V1, which now points to a physical address PYYY06, and wherein line 42 indicates the new PDR pointing to the original physical address, PYYY01. The volume associated with the new PDR is MV1, rather than V3. Subsequent commands to read or write data of P1 of V3 will access this PDR through an iterative process such as that described above with respect to steps 76-80 of read process 70 (FIG. 4). The association of the PDR with the meta-volume allows storage system 10 to support a substantially unlimited number of copied volumes, through the linking of meta-volumes described further hereinbelow.

By way of a second example of process 90, a second write command may be received by cache 18 at step 92, the second write command specifying another modification to P1 of V1. The PDRs of cache 18 are assumed to comprise the PDRs of Set 3, as established above. In response to the second write command, cache 18 performs steps 96-110, as above. At step 96, a PDR is identified (line 37 of Set 3), and at step 106, V1 is determined to be a source volume for a copied volume. As above, processing continues at step 110, at which the change flag is determined to be set. Consequently, the identified PDR of V1 is no longer needed by copied volumes. Thus the "yes" branch from step 110 is followed to a step 108, at which the new data is written to the data addressed by the PDR, overwriting the previous data. No changes are made to the PDRs of cache 18.

By way of a third example of process 90, a third write command may be received by cache 18 at step 92, the third write command specifying modification of data at P1 of V3. At decision step 96, no PDR associated with V3 is found. Thus processing continues at a step 98, at which a superior volume of V3 is determined to be MV1 from the logical volume records. At a subsequent decision step 100, a PDR associated with P1 of MV1 is sought. Such a PDR exists (line 42 of Set 3), and processing thus continues at step 102. If the identified PDR of MV1 did not exist, steps 98 and 100 would have been repeated until a superior volume was found associated with the PDR for P1.

At step 102, the data at a physical address linked to the identified PDR is modified according to the write command. The data is stored at a new physical address, and a new PDR pointing to the new physical address is created for P1 of V3. The state of meta-data following this addition is indicated by Set 4. The new PDR is indicated by a record at line 63. The other records (lines 49-62) of Set 4 are unchanged from their prior status (lines 29-42 of Set 3). The new PDR at line 63 points to the new physical address (indicated as PYYY07).

Assuming that all prior steps of process 90 have been completed successfully, cache 18 returns an acknowledgement of successful completion to network interface 33 at a step 104.

It may be understood that process 90 illustrates a "bottom-up" algorithm for seeking a PDR, whereby the iterative search begins by seeking a PDR associated with the copied volume (step 96), and then continues by iteratively seeking PDRs associated with superior meta-volumes. Alternatively, a "top-down" algorithm may be used, whereby a PDR is first sought for the most superior volume of a logical volume (e.g., V1 is the most superior volume of V3). Subsequently, each subordinate volume is checked until the PDR is found.

Figure 6:
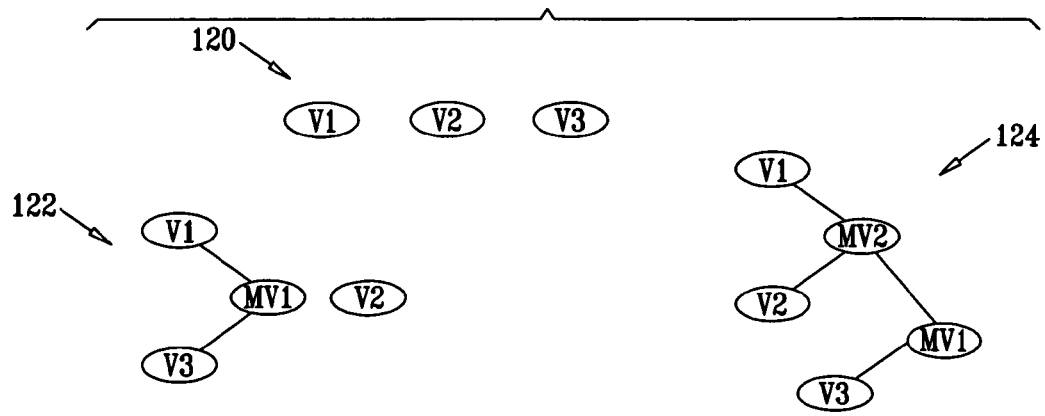
FIG. 6 is an exemplary diagram of hierarchies of meta-volumes, in accordance with an embodiment of the present invention.

FIG. 6 displays three exemplary diagrams of relationships between logical volumes and meta-volumes, in accordance with an embodiment of the present invention. In a first diagram 120, the three logical volumes V1, V2, and V3 are shown as independent entities, corresponding to the state indicated by Set 1 of the Appendix. A second diagram 122 shows the hierarchical relationship created after a copy command is performed, designating V3 as a copy of V1. Diagram 122 corresponds to the state of meta-data indicated by Set 2 of the Appendix. As shown, V1 becomes superior to MV1, which is superior to V3; V2 remains independent. The hierarchical relationship indicates the order of searching for PDRs for "bottom-up" or for "top-down" iterative searches, as described above. For example, when a "bottom-up" algorithm is implemented, a command to access data of V3 will be implemented by first seeking a PDR with the indicated partition ID and with the volume field set to V3. If this PDR is not found, then the control unit proceeds to search for a PDR with a volume field set to MV1. If this PDR is not found, the search continues for a PDR with the volume field set to V1.

If a second copy command designating V2 as a copy of V1 is received, control unit 38 creates a second meta-volume, MV2. To implement the second copy command, the control unit again follows process 50 (FIG. 3). Control unit 38 creates a meta-volume record for MV2 at step 54. Next, at step 56, links are established defining MV2 to be superior to V2 and to MV1.

Set 5 of the Appendix shows the specific modifications made to the configuration records after the implementation of the second copy command. Prior to implementation of the command, Set 3 is assumed to reflect the state of meta-data of cache 18. The MV2 meta-volume record is indicated as line 84 of Set 5, with the "superior volume" field set to V1. The size of MV2 is set equal to the size of V1. Note that V2 is larger than V1, which means that V2 may store more data than was planned for V1. A third diagram 124 corresponds to the state indicated by Set 5.

The MV1 record (line 83) is modified to indicate that MV2 is now the superior volume of MV1. The V2 record (line 86) is modified to indicate that MV2 is now a superior volume to V2. Former PDRs of V2 (lines 40 and 41 of Set 3) are deleted, as V2 is now associated with the data of V1. The deletion may be implemented either in response to a delete management command received prior to the copy command or in conjunction with, or as part of, the copy command. The change counter fields of all V1 PDRs (e.g., the change counter of the PDR of line 93) are set to 0, because all PDRs of V1 must be copied before data is changed, in order to preserve the copied data for V2.

It may be understood from the description above that additional meta-volumes may be added to the hierarchy represented by diagram 124, such that an extremely large chain of copies may be generated. The only resources utilized by each copy are the few bytes required for the additional configuration records.

Although the embodiments described hereinabove relate to a distributed data storage system serving host computers over a network, it will be appreciated that the principles of the present invention may also be applied, mutates mutandis, to storage systems in other configurations, such as stand-alone systems serving individual or multiple hosts. The methods described hereinabove may also be applied to additional data storage management commands such as a command to copy a source volume to multiple copied volumes, some of which may be read-only volumes. It will thus be appreciated that the embodiments described above are cited by way of example, and the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

APPENDIX

Set 1: Sample configuration records for three logical volumes, V1, V2 and V3. No logical volume is linked to a meta-volume, so there are no meta-volume records.

| | | Logical Volume Records | | |
|---|---|---|---|---|
| Line # | Name | Size | Superior Volume | Comments |
| 1 | V1 | 100 | 0 | |
| 2 | V2 | 200 | 0 | |
| 3 | V3 | 100 | 0 | |

| | | Partition Descriptor Records | | |
|---|---|---|---|---|
| | Volume | Partition ID | Change Flag | Physical Address | Comments |
| 7 | V1 | P1 | 0 | PYYY01 | |
| 8 | V1 | P5 | 0 | PYYY02 | |
| 9 | V1 | P9 | 0 | PYYY03 | |
| 10 | V2 | P1 | 0 | PYYY04 | |
| 11 | V2 | P5 | 0 | PYYY05 | |

Set 2: Sample records for logical volumes, V1, V2, and V3, after V3 is designated a copy of V1. Meta-volume MV1 is created as a superior volume to V3, and V1 is set as a superior volume of MV1. PDRs of V3 are deleted.

Meta-Volume Records

| Line # | Name | Size | Superior Volume | Comments |
|---|---|---|---|---|
| 14 | MV1 | 100 | V1 | New record |

Logical Volume Records

| | Name | Size | Superior Volume | Comments |
|---|---|---|---|---|
| 15 | V1 | 100 | 0 | |
| 16 | V2 | 200 | 0 | |
| 17 | V3 | 100 | MV1 | Modified |

Partition Descriptor Records

| | Volume | Partition ID | Change Flag | Physical Address | Comments |
|---|---|---|---|---|---|
| 22 | V1 | P1 | 0 | PYYY01 | |
| 23 | V1 | P5 | 0 | PYYY02 | |
| 24 | V1 | P9 | 0 | PYYY03 | |
| 25 | V2 | P1 | 0 | PYYY04 | |
| 26 | V2 | P5 | 0 | PYYY05 | |

Set 3: Sample records after writing to partition P1 of V1.

Meta-Volume Records

| Line # | Name | Size | Superior Volume | Comments |
|---|---|---|---|---|
| 29 | MV1 | 100 | V1 | |

Logical Volume Records

| | Name | Size | Superior Volume | Comments |
|---|---|---|---|---|
| 30 | V1 | 100 | 0 | |
| 31 | V2 | 200 | 0 | |
| 32 | V3 | 100 | MV1 | |

Partition Descriptor Records

| | Volume | Partition ID | Change Flag | Physical Address | Comments |
|---|---|---|---|---|---|
| 37 | V1 | P1 | 1 | PYYY06 | Modified |
| 38 | V1 | P5 | 0 | PYYY02 | |
| 39 | V1 | P9 | 0 | PYYY03 | |
| 40 | V2 | P1 | 0 | PYYY04 | |
| 41 | V2 | P5 | 0 | PYYY05 | |
| 42 | MV1 | P1 | 0 | PYYY01 | New record |

Set 4: Sample records after writing to partition P1 of V3, causing the creation of a new PDR (line 63).

Meta-Volume Records

| Line # | Name | Size | Superior Volume | Comments |
|---|---|---|---|---|
| 49 | MV1 | 100 | V1 | |

Logical Volume Records

| | Name | Size | Superior Volume | Comments |
|---|---|---|---|---|
| 50 | V1 | 100 | 0 | |
| 51 | V2 | 200 | 0 | |
| 52 | V3 | 100 | MV1 | |

Partition Descriptor Records

| | Volume | Partition ID | Change Flag | Physical Address | Comments |
|---|---|---|---|---|---|
| 57 | V1 | P1 | 1 | PYYY06 | |
| 58 | V1 | P5 | 0 | PYYY02 | |
| 59 | V1 | P9 | 0 | PYYY03 | |
| 60 | V2 | P1 | 0 | PYYY04 | |
| 61 | V2 | P5 | 0 | PYYY05 | |
| 62 | MV1 | P1 | 0 | PYYY01 | |
| 63 | V3 | P1 | 0 | PYYY07 | New record |

Set 5: Sample records of logical volumes, V1, V2, and V3, after V2 is designated a copy of V1. PDRs of V2 (lines 40 and 41) are deleted.

Meta-Volume Records

| Line # | Name | Size | Superior Volume | Comments |
|---|---|---|---|---|
| 83 | MV1 | 100 | MV2 | Modified |
| 84 | MV2 | 100 | V1 | New record |

Logical Volume Records

| | Name | Size | Superior Volume | Comments |
|---|---|---|---|---|
| 85 | V1 | 100 | 0 | |
| 86 | V2 | 200 | MV2 | Modified |
| 87 | V3 | 100 | MV1 | |

Partition Descriptor Records

| | Volume | Partition ID | Change Flag | Physical Address | Comments |
|---|---|---|---|---|---|
| 93 | V1 | P1 | 0 | PYYY06 | Modified |
| 94 | V1 | P5 | 0 | PYYY02 | |
| 95 | V1 | P9 | 0 | PYYY03 | |
| 98 | MV1 | P1 | 0 | PYYY01 | |

We claim:

1. A method for copying a logical volume in a data storage system, comprising:
   forming a first logical volume;
   storing data belonging to the first logical volume in physical storage of the data storage system;
   receiving a first command to copy the first logical volume to a second logical volume;
   executing the first command by forming meta-data that designates the first logical volume as a first superior volume of a meta-volume and that designates the meta-volume as a second superior volume of the second logical volume;
   receiving a second command to access data in the second logical volume;
   executing the second command by using the meta-data to access the data in the data storage system;
   receiving a third command to access the data in the first logical volume; and
   executing the third command by accessing the data in the data storage system independently of the meta-data;
   receiving a fourth command, subsequent to the first, second and third commands, to copy the first logical volume to a third logical volume;
   executing the fourth command by altering the meta-data to form modified meta-data that designates:

the first logical volume as a third superior volume of a further meta-volume; and the further meta-volume as a fourth superior volume of the meta-volume and as a fifth superior volume of the third logical volume;

receiving a fifth command, subsequent to the fourth command, to access the data in the first logical volume;

executing the fifth command by accessing the data in the data storage system independently of the modified meta-data;

receiving a sixth command, subsequent to the fourth command, to access the data in the second or third logical volumes;

executing the sixth command by using the modified meta-data.

2. The method according to claim 1, wherein storing the data comprises generating a partition descriptor record linking a physical address of the data with a logical address of the first logical volume, the physical address being an address of the data storage system, and wherein executing the third command comprises using the partition descriptor record to access the data.

3. The method according to claim 2, wherein executing the first command comprises forming the meta-data without generating a further partition descriptor record linking the physical address of the data with a further logical address in one or more of the second logical volume and the meta-volume.

4. The method according to claim 2, wherein the partition descriptor record comprises a two-state change flag which in an unset state indicates that the data at the physical address has not been changed since a last copy command for the first logical volume was executed, and which in a set state indicates that the data at the physical address has been changed since the last copy command for the first logical volume was executed, and wherein generating the partition descriptor record comprises setting the change flag to the unset state.

5. The method according to claim 4, and comprising:

receiving a seventh command to write modified data to the logical address of the first logical volume;

executing the seventh command by writing the modified data to a new physical address of the data storage system; and modifying the partition descriptor record by setting the change flag therein to the set state, and by linking the logical address of the first logical volume with the new physical address.

6. The method according to claim 5, wherein executing the seventh command comprises generating a new partition descriptor record linking the physical address to the meta-volume.

* * * * *